July 10, 1945.　　　W. STRAUSS　　　2,380,084
PUSH-OFF DEVICE
Filed Oct. 9, 1942　　2 Sheets-Sheet 1

INVENTOR.
William Strauss
BY Ralph B. Stewart
ATTORNEY

July 10, 1945.  W. STRAUSS  2,380,084
PUSH-OFF DEVICE
Filed Oct. 9, 1942  2 Sheets-Sheet 2
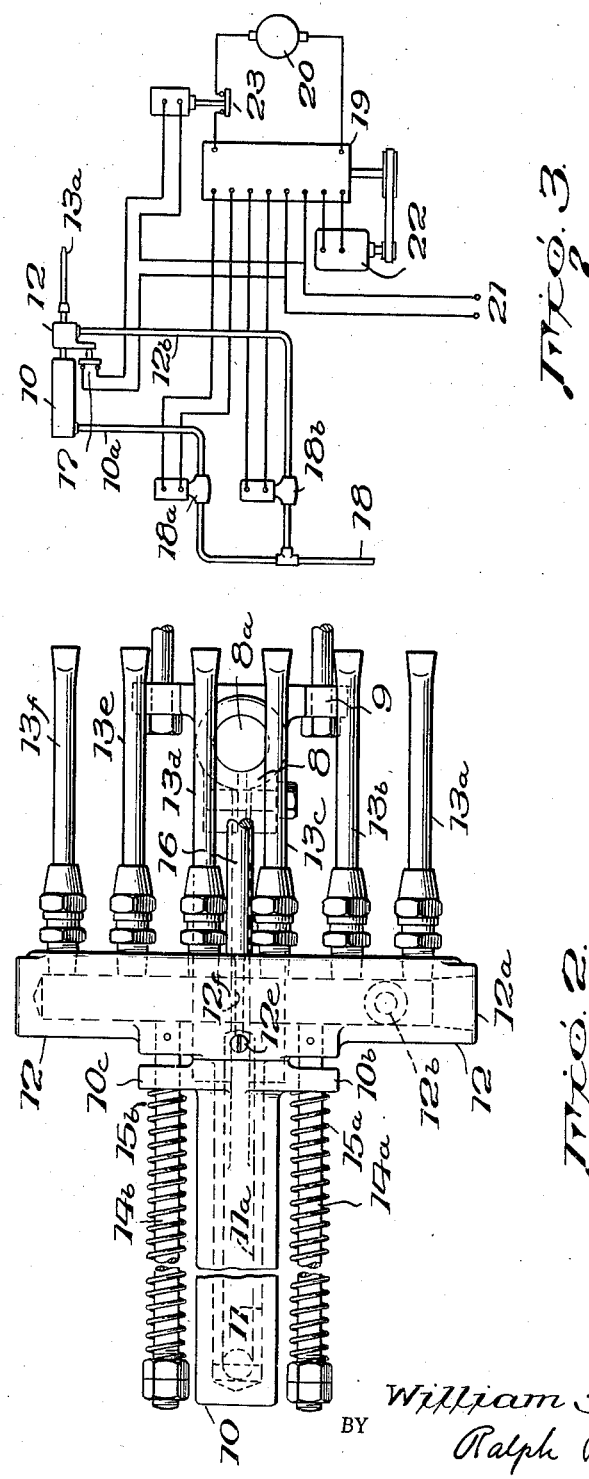
INVENTOR.
William Strauss
BY Ralph B. Stewart
ATTORNEY Patented July 10, 1945

2,380,084

UNITED STATES PATENT OFFICE 2,380,084

PUSH-OFF DEVICE

William Strauss, Philadelphia, Pa., assignor to F. J. Stokes Machine Company, a corporation of Pennsylvania Application October 9, 1942, Serial No. 461,483

6 Claims. (Cl. 18—16)

This invention relates to a device for discharging molded articles from a molding press. In particular, it relates to a device for discharging molded articles from a press by means of an air blast, and also embodies means for positively removing the article from the press where the air blast alone is ineffective for this purpose.

In United States Patent 2,242,189 there is shown the use of a fixed air jet for discharging molded articles from a press by an air blast, and a pivoted knock-off lever is also provided to positively discharge the article from the press in case it is not removed by the air blast. My present invention combines both functions in one device; that is, the air nozzle is arranged to travel between the molded parts in the path of the molded article, and if the air jet is not effective in removing the article from the mold parts, then the air nozzle engages the article and dislodges it from the mold part.

My invention is illustrated in the accompanying drawings in which

Figure 2 is a plan view of the push-off device, certain air nozzles being broken away to show the parts located beneath the nozzles; and Figure 3 is a diagrammatic view of the control system for operating the push-off device.

Figure 1:
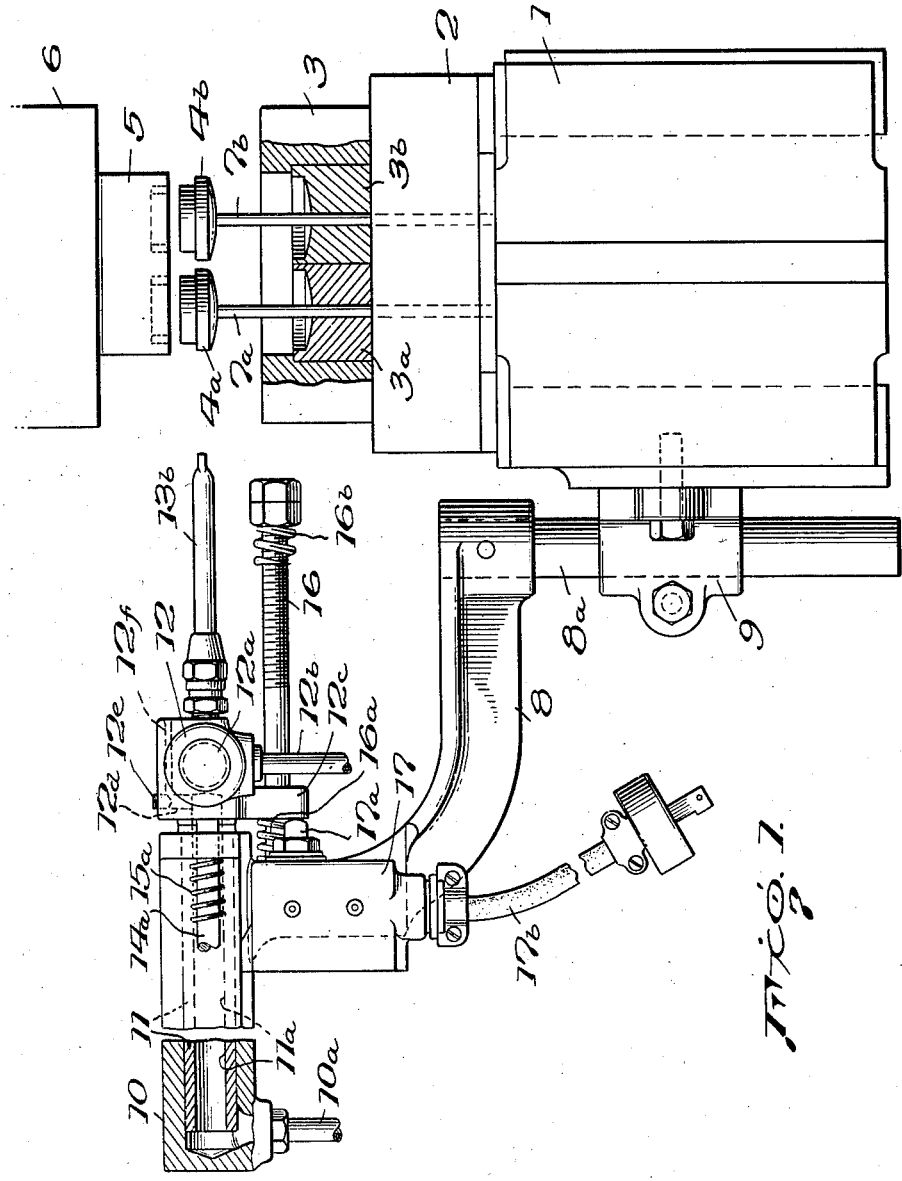
Figure 1 is a side elevational view of a part of a molding press showing my push-off device mounted in proper position, certain lower mold parts being shown in section.

Referring to the drawings, 1 indicates a lower cross-head of a molding press carrying a heated platen 2 which in turn carries the lower die plate 3. Any desired number of die elements may be embodied in the plate 3, and in the arrangement shown in Figure 1, two die elements 3a and 3b, shown in section, are arranged to form the upper surfaces of molded knob elements 4a and 4b, respectively. It is understood that the knob elements are shown in inverted position in Figure 1.

The upper mold part 5 cooperating with the lower die plate 3 is carried by an upper heated platen 6. It will be understood that the press embodies suitable means for producing relative vertical movement between platens 2 and 6 to bring the mold parts together in molding relation and then to separate the mold parts to the position shown in Figure 1. The press also embodies suitable knock-out pins 7a and 7b for ejecting the molded articles from die elements 3a and 3b in the usual manner. The push-off device is provided with a mounting bracket 8 having a mounting stem 8a adjustably clamped in a mounting bracket 9 secured to the front face of crosshead 1. Such an arrangement permits vertical adjustment of the position of the push-off device with respect to the mold parts. The push-off device has an air cylinder 10 mounted at the top of bracket 8 and the rear end of this cylinder is supplied with air under pressure through a connection 10a leading to a suitable source of compressed air. A reciprocating piston 11 is mounted within cylinder 10 and carries a manifold 12 at its forward end arranged transversely thereof. The manifold 12 may be formed integral with the piston 11 or they may be formed of separate units joined together. The manifold 12 is hollow and is closed at its open end by a suitable plug 12a. Air or other fluid under pressure is supplied to the manifold from a suitable source through a connection 12b. A series of air nozzles 13a, 13b, 13c, 13d, 13e and 13f are mounted on manifold 12 and are supplied with compressed air from the manifold. These nozzles are arranged horizontally and are directed in line with a molded article when in the position shown in Figure 1. For example, the nozzle 13a in Figure 1 is positioned in line with knobs 4a and 4b. The remaining nozzles would be positioned in line with other pairs of knobs in a mold adapted to mold six pairs of knobs simultaneously.

A pair of spring supporting rods 14a and 14b are positioned on opposite sides of cylinder 10, passing through holes formed in lateral flanges 10b and 10c carried by the forward end of cylinder 10 and are secured to manifold 12. A pair of compression springs 15a and 15b are carried by rods 14a and 14b, respectively, and normally urge the manifold 12 to the left so that the piston 11 is normally retracted in the cylinder 10, suitable means such as the double-nut shown being provided on the ends of rods 14a and 14b to maintain the springs on the rods.

A stop rod 16 is secured to bracket 8 below the forward end of cylinder 10 and extends forward of the cylinder and passes through a hole formed in a depending flange 12c on manifold 12. A short coiled spring 16a is carried by the rod 12 between the bracket 8 and the flange 12c in order to cushion the rearward movement of the manifold 12. A similar coiled spring 16b is positioned at the other end of the rod 16 on the opposite side of flange 12c and normally cushions the outward movement of the manifold 12, the spring 16b being retained on the rod by suitable means such as the double-nut shown.

Piston 11 has a central bore 11a extending from the rear end forward into manifold 12 but stopping short of the bore in the manifold. A vertical bore 12d is formed in the upper part of manifold 12 communicating with the front end of the bore 11a, and this bore is threaded and is normally closed by an adjustable screw 12e. A small horizontal bore 12f is formed in manifold 12 extending from the front face thereof and connecting at the rear end to passage 12d. The arrangement is such that by adjusting screw 12e the amount of air which passes through the bore 12f may be regulated.

A safety switch 17 is mounted on bracket 8 in a position where flange 12c on manifold 12 operates the switch stem 17a when the manifold is in its retracted position. A connecting cord 17b connects the switch in a suitable control circuit, one of the examples of which is shown in Figure 3. The construction of switch 17 will depend upon the type of control to be exercised by the switch, but in the arrangement illustrated in the drawings, the switch is normally spring biased to open position but is held in closed position by the manifold in its retracted position, and the switch is connected in the control circuit in a manner to prevent operation of the press except when the manifold is retracted.

When installing the push-off device, the device is adjusted vertically until the air nozzles are in line horizontally with the molded articles when they are resting upon the knock-out pins as shown in Figure 1, and the nozzles can move freely into the space between the upper and lower die elements without interference with these elements or with the knock-out pins. Air is supplied to cylinder 10 and manifold 12 in timed relation with the operation of the press in such a manner that when the press operates to open position, the manifold is moved forward and simultaneously air is supplied to manifold 12 so that air jets impinge upon the molded articles and discharge the articles from the press. By controlling the admission of air to manifold 12 so that the jets are effective during the entire upward movement of the knock-out pins, usually all of the molded articles will be discharged from the press as soon as the articles have been pushed out of the mold cavities by the knock-out pins. In case an article adheres to a knock-out pin so strongly that the air blast is ineffective to remove it, continued movement of the manifold will result in contact of one of the air nozzles with the molded article adhering to the pin and will dislodge the article from the pin. The arrangement is such that the manifold travels far enough to dislodge any articles which may be sticking to the back row of pins, and then the air is cut off from cylinder 10. The manifold is then returned to its normal position by operation of biasing springs 15a and 15b, the rate of return movement being controlled by the adjustment of the air throttling screw 12e which controls the discharge of air stored in cylinder 10 through passage 12f. The air supply to manifold 12 may be continued until the manifold returns to its normal position, thus the air jets are continued during the backward stroke of the manifold and serve to clean both mold parts of any loose material which may remain thereon. On the forward stroke of the manifold the movement is arrested by spring 16b, and the return movement is arrested by spring 16a.

Various control circuits are possible, and one example is shown in Figure 3. Compressed air from a suitable supply line 18 may be supplied to cylinder 10 through an electromagnetic valve 18a and to manifold 12 through an electromagnetic valve 18b. These two valves are controlled in timed relation with the operation of the press by means of a cycle controller 19 which controls the press operating motor 20 which is energized from a suitable supply circuit 21. The controller 19 may be of any suitable construction and may be operated by a controller motor 22 which may also be energized from circuit 21 through controller 19. The arrangement is such that the press is operated through a succession of cycles, and usually a timing device is embodied in the controller for the purpose of stopping the press in closed position for a predetermined curing time. An electromagnetically operated switch 23 is included in the circuit to motor 20 and is controlled by safety switch 17 so that the motor circuit is closed only when the manifold 12 is in its normal retracted position. As soon as the manifold moves away from its normal position, switch 23 is de-energized and motor 20 cannot be energized to operate the press. Switch 23 may be a normally closed, normally de-energized relay, and switch 17 would then be of the type which is normally biased to closed position but is held in open position by manifold 12.

By providing the throttled vent 12f for the air stored in cylinder 10 after valve 18a closes, it is possible to use a simple on-and-off valve at 18a. Also, this arrangement provides for the easy adjustment of the rate of return of manifold 12 to its normal position. Furthermore, the air escaping through vent passage 12f is directed in the same direction as the air jets and will assist in discharging the molded articles and cleaning the mold parts. If desired, a 3-way valve may be used at 18a or at 18b for controlling cylinder 10 and manifold 12.

From the foregoing it will be seen that I have provided a device in which the molded articles are normally discharged from the press by the action of the air blasts on the molded articles, but the jet pipes or nozzles are mounted for movement transversely of the press in order to positively dislodge the articles from the mold parts or knock-out pins in case the air jets are ineffective. A separate jet pipe is provided for each row of molded articles, and the various jet pipes are arranged in line with the respective rows of articles.

My invention is not limited to the use of compressed air since other gases or fluids may be employed if desired.

What I claim is:

1. A push-off device for a molding press comprising, in combination, a jet pipe manifold, a plurality of jet pipes mounted on said manifold and positioned to direct a plurality of substantially parallel air streams transversely of the press and into the space between the mold parts in said press to discharge molded articles therefrom, and means for mounting said manifold for movement in the direction of said air streams whereby said jet pipes come into contact with any molded articles which are not discharged from the press by said streams.

2. A push-off device for a molding press comprising, in combination, a jet pipe positioned to direct an air stream between the mold parts of the press to discharge molded articles therefrom, an air cylinder provided with a piston, said jet pipe being mounted on the piston of said cylinder for movement along its axis into the space normally occupied by the molded article when the press is open, a common source of fluid under pressure, separate valves for controlling the supply of fluid from said source to said jet pipe and to said air cylinder, and means for operating said valves in timed relation so that the air stream is directed against the molded article before said jet pipe moves into position to engage said article.

3. A push-off device for a molding press comprising, in combination, an air cylinder having a piston therein mounted adjacent said press for movement transversely of the press, a jet pipe manifold carried by said piston, a plurality of jet pipes mounted on said manifold and arranged to direct a plurality of parallel air streams transversely of said press for discharging molded articles from between the separated mold parts, a connection from said air cylinder to a source of fluid under pressure including a valve controlling the admission of fluid to said cylinder, a vent passage formed in said manifold and having a connection to the inner space of said air cylinder, said vent passage being positioned to direct an air stream parallel to the streams formed by said jet pipes, and means for adjusting the rate of flow through said vent passage.

4. A push-off device comprising an air cylinder having a piston therein, a jet pipe manifold carried by said piston, a plurality of jet pipes carried by said manifold and arranged to produce a plurality of substantially parallel air streams, spring biasing means for normally retracting said piston in said cylinder, a vent passage formed in said manifold and having a connection to the inner space of said air cylinder, said vent passage being positioned to direct an air stream parallel to the streams formed by said jet pipes, and means for adjusting the rate of flow through said vent passage.

5. A push-off device comprising an air cylinder having a piston therein, a jet pipe manifold mounted upon said piston and arranged transversely thereof, a plurality of jet pipes carried by said manifold and arranged substantially parallel with each other and substantially parallel with said piston, a pair of flanges extending laterally from opposite sides of said cylinder, a pair of guide rods secured to said manifold and extending rearwardly through holes formed in said lateral flanges, and a compression spring carried by each guide rod and serving normally to maintain the piston in retracted position within said cylinder.

6. A push-off device according to claim 3 wherein said valve operating means operates to cut off the fluid supply to said cylinder in advance of cutting off the supply to said jet pipe, and including spring means for returning said piston and jet pipe to their normal positions, and an adjustable vent passage for said cylinder to control the rate of return of said jet pipe to its normal position.

WILLIAM STRAUSS.